United States Patent
Wang et al.

(10) Patent No.: US 7,417,079 B2
(45) Date of Patent: Aug. 26, 2008

(54) USE OF STYRENE-MALEIC ANHYDRIDE COPOLYMER TO CONTROL BLACK-TO-COLOR BLEED

(75) Inventors: Patricia A Wang, Salem, OR (US); Alexey S Kabalnov, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 10/628,966

(22) Filed: Jul. 28, 2003

(65) Prior Publication Data

US 2005/0027035 A1    Feb. 3, 2005

(51) Int. Cl.
*C09D 11/00* (2006.01)
*C09D 1/00* (2006.01)
*C09D 4/06* (2006.01)
*C09D 11/10* (2006.01)
*C09D 4/00* (2006.01)

(52) U.S. Cl. .................. 523/160; 523/161; 524/577; 524/819; 106/31.6; 106/31.13

(58) Field of Classification Search .................. 523/160, 523/161; 524/577, 819; 106/31.6, 31.13
See application file for complete search history.

(56) References Cited

U.S. PATENT DOCUMENTS

| | | | |
|---|---|---|---|
| 3,053,779 A | 9/1962 | O'Neill | |
| 5,085,698 A | 2/1992 | Ma et al. | |
| 5,133,803 A | 7/1992 | Moffatt | |
| 5,172,133 A | 12/1992 | Suga et al. | |
| 5,221,334 A | 6/1993 | Ma et al. | |
| 5,462,592 A * | 10/1995 | Murakami et al. | 106/31.43 |
| 5,555,008 A | 9/1996 | Stoffel et al. | |
| 5,571,311 A | 11/1996 | Belmont et al. | |
| 5,631,309 A | 5/1997 | Yanagi et al. | |
| 5,637,140 A | 6/1997 | Fujioka | |
| 5,734,403 A * | 3/1998 | Suga et al. | 347/101 |
| 5,785,743 A | 7/1998 | Adamic et al. | |
| 5,801,738 A | 9/1998 | Stoffel et al. | |
| 5,883,157 A | 3/1999 | Yamashita et al. | |
| 5,889,083 A * | 3/1999 | Zhu | 523/161 |
| 5,938,829 A | 8/1999 | Higashiyama et al. | |
| 5,977,207 A | 11/1999 | Yui et al. | |
| 6,139,139 A | 10/2000 | Stoffel et al. | |
| 6,221,142 B1 | 4/2001 | Wang | |
| 6,261,350 B1 * | 7/2001 | Kabalnov | 106/31.33 |
| 6,281,267 B2 | 8/2001 | Parazak | |
| 6,300,391 B2 | 10/2001 | Parazak et al. | |
| 6,500,880 B1 | 12/2002 | Parazak | |
| 6,585,815 B2 * | 7/2003 | Koitabashi et al. | 106/31.27 |
| 6,688,730 B2 * | 2/2004 | Asaki et al. | 347/64 |
| 6,695,900 B2 * | 2/2004 | Momose | 106/31.75 |
| 6,740,689 B1 * | 5/2004 | Lee et al. | 523/160 |
| 2001/0008908 A1 | 7/2001 | Parazak | |

FOREIGN PATENT DOCUMENTS

| | | |
|---|---|---|
| EP | 0 801 119 A1 | 10/1997 |
| EP | 1 108 756 A2 | 6/2001 |
| WO | WO 01/94476 | 12/2001 |

* cited by examiner

*Primary Examiner*—Sanza L McClendon

(57) ABSTRACT

The use of a styrene-maleic anhydride copolymer in self-dispersed black pigment inks provides a means of achieving black-to-color bleed control against color.

40 Claims, No Drawings

USE OF STYRENE-MALEIC ANHYDRIDE COPOLYMER TO CONTROL BLACK-TO-COLOR BLEED

TECHNICAL FIELD

The present application is directed to inkjet printing, and, more particularly, to controlling black-to-color bleed in inkjet inks.

BACKGROUND ART

One of the issues confronting formulators of inkjet ink sets comprising black and color (e.g., cyan, yellow, magenta) is that of black-to-color bleed. This has been an issue earlier for dye-based colorants and, more recently, for pigment-based colorants.

The term "bleed" as used herein, is defined as follows: When inks of two different colors are printed next to each other, it is desired that the border between the two colors be dean and free from the invasion of one color into the other. When one color does invade into the other, the border between the two colors becomes ragged, and this is bleed. This is in contradistinction to uses of the term in the prior art, which often defines "bleed" in the context of ink of a single color following the fibers of the paper.

The term "halo" applies to the printing defect that occurs in black areas surrounded by color ink. In some cases, a distinct light-gray zone is seen where the black is adjacent to color. The defect is normally seen within 2 to 3 mm from the line dividing the black and color areas and occurs on the black side.

Finally, "mottle" is defined as a color or black non-uniformity on top of the paper, with some areas darker than others.

The present teachings specifically address the case where the color inks are dye-based and the black inks are pigment-based. This approach turns out to deliver the best performance for ink-jet printers overall, combining the good text quality and business graphics of the pigmented black inks with the bright colors of the dye-based color inks. Dye-based systems, in which the dye colorant is soluble in water, have different considerations than pigment-based systems, in which the pigment colorant is insoluble in water and must be rendered dispersible, such as by the use of polymeric dispersants or by self-dispersing the pigment.

Adding polymers to pigmented systems is well known in the art. Polymers tend to stabilize the dispersion, as well as improve such attributes as the black-to-color bleed, optical density of the black, halo, and mottle. For example, pigmented inks have been disclosed that contain AB and BAB block-copolymers, where the blocks are made out of various monomers of acrylic family. As another example, a relatively high molecular weight (>10,000) polysaccharide such as alginic acid or carrageenan has been used. As another example, the use of polymeric resins, in particular, styrene-acrylic copolymers in pigmented inks is known. Still further, inks containing a carboxylic salt polymer are known. Also, inks containing a copolymer of a hydrophobic $\alpha,\beta$-unsaturated ethylene monomer, and a hydrophilic monomer having a plurality of COOM groups (where M is hydrogen, alkali metal, or an ammonium ion) are known. Specifically, the hydrophobic monomer can be styrene and hydrophilic monomer can be maleic anhydride. In addition, an ink-jet ink containing two dispersants: one containing a sulfonic acid salt/ester, and the other containing a carboxylic acid salt, within a specific range of molecular weights has been described. Finally, a number of polymers for the bleed and halo control are described, most of them being of the acrylic type.

It has been known in the art that introducing chemical reactivity between the color and black inks brings many positive features to ink-jet performance, such as color-to-black bleed control and decreasing the halo. Also, it has been discovered that if reactive color inks are used for underprinting under the black areas, the optical density of the black is improved. The interaction between the polymeric dispersant and polyvalent metal ions in the color inks has been described for controlling bleed/halo/mottle. Alternatively, the reaction with the polymer can be triggered by organic acids in the color inks.

Aside from polymeric dispersants, there is another approach for preparing colloidal pigment dispersions, called self-dispersion. It typically involves attaching solubilizing groups to the pigment. There are several methods known in the art that enable the attachment of a solubilizing ionic group to the surface of a pigment particle. For example, a method of attaching an ionic group to the carbon surface is based on the reactions of diazonium salts. On the other hand, a reaction by oxidation of the surface of the pigment particles may be performed using ozone.

Developing black-to-color bleed control mechanisms for self-dispersed black pigment inks, such as those available from Cabot Corp., is typically harder than for conventionally dispersed black inks (e.g., using polymeric pigment dispersants) because the self-dispersed pigments are highly electrostatically stabilized. In addition, there is no polymeric dispersant which, when reacted, rapidly builds viscosity and limits ink migration. As an example, a series of polymers of the acrylic type have been used to improve the color-to-bleed and halo of the black pigmented inks.

However, adding polymeric dispersants to the pigment-based black inks in many cases leads to nozzle clogging and other reliability issues. Therefore, a need remains in further improving the polymeric dispersants. Also, a need remains in finding the polymers that can provide the best reactivity with the reactive components in the dye-based color inks.

DISCLOSURE OF INVENTION

In accordance with the embodiments disclosed herein, a styrene-maleic anhydride copolymer is added to black pigment inks. Such a copolymer is unexpectedly found to provide black-to-color bleed control against color inks.

In accordance with one embodiment, an inkjet ink set comprises a pigment-based black ink and at least one dye-based color ink. The black ink includes at least one black pigment, at least one cosolvent, water, optionally at least one water-soluble surfactant/amphiphile, and a polymer, wherein the polymer comprises a hydrolyzed form of styrene-maleic anhydride copolymer.

In accordance with a second embodiment, a method of controlling bleed between the black pigment-based inkjet ink and the dye-based color ink-jet ink is provided. The method comprises formulating the black ink with the styrene-maleic anhydride bleed controlling copolymer.

BEST MODES FOR CARRYING OUT THE INVENTION

Reference is made now in detail to specific embodiments, which illustrates the best mode presently contemplated by the inventors for practicing the teachings herein. Alternative embodiments are also briefly described as applicable.

All concentrations herein are in weight percent, unless otherwise indicated. The purity of all components is that employed in normal commercial practice for ink-jet inks. All references are hereby incorporated by reference.

In accordance with the teachings herein, a styrene-maleic anhydride (SMA) copolymer is added to self-dispersed black pigment inks. Self-dispersed inks containing the disclosed polymer afford improved black-to-color bleed as compared to inks without the polymer. Advantageously, there is no loss in OD or negative impact on decap or ink reliability.

The use of styrene-maleic anhydride copolymer in self-dispersed black pigment inks provides a means of achieving black-to-color bleed control against color inks with a moderate concentration (3 to 6% by weight) of $Mg(NO_3)_2 \cdot 6H_2O$. The use of multi-valent salts, such as magnesium nitrate, is taught, for example, in U.S. Pat. No. 5,536,306, entitled "Thermal Ink-Jet Inks Having Reduced Black to Color or Color to Color Bleed", issued on Jul. 16, 1996, to Loren E. Johnson et al and assigned to the same assignee as the present application.

The polymers described herein are the copolymers of maleic acid anhydride and styrene, as shown below as general Formula (I):

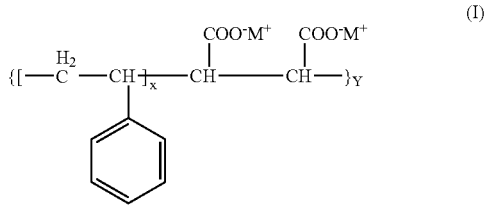

Maleic anhydride is hydrolyzed by a MOH base after polymerization to form a salt of polycarboxylic acid, where the counter-ion $M^+$ is selected from the group consisting of sodium, potassium, ammonium, trimethylammonium, lithium or other suitable cation. The copolymers can be random or block copolymers and have the molar ratio of the styrene/maleic anhydride repeat units from 0.2 to 5, preferably from 0.5 to 2. The polymers of various molecular weights can be used. Normally, increasing the molecular weight improves properties of the inks such as optical density, bleed, and mottle control. On the other hand, too high a molecular weight worsens the nozzle reliability. The preferred range of the molecular weights is from 500 to 50,000, more preferably from 1,000 to 10,000. Several brands of maleic anhydride/styrene copolymer are available from Sartomer Company under the brand of SMA polymers. An example of a preferred polymer is Sartomer's SMA-1000H.

The SMA-1000H copolymer represents a random copolymer of styrene and maleic anhydride at the monomer ratio of 1:1; in the formula above, where $X \cong 1$ and $Y \cong 22$. After polymerization, the copolymer has been hydrolyzed with ammonia to a pH of 8.5 to 9.5, to an acid number of 480; the weight average molecular weight as determined by the gel exclusion chromatography is equal to 5500. Accordingly, the counter-ion in Formula (I) $M = NH_4^+$. The glass transition temperature of the polymer is equal to 155° C. and it is available as a solution in water at 30 to 40% solids. The polymer can be used in the inks at concentrations from 0.1 to 10 wt %, more preferably from 0.3 to 3 wt %. The pigment load in the black ink can be from 0.1 to 10 wt %, preferably from 2 to 5%.

Black Ink Formulation

Pigments/Dispersants

A wide variety of organic and inorganic self-dispersed pigments, either alone or in combination, may be benefited in the practice of the present teachings, since it is contemplated that any pigments or combination thereof may be benefited in the practice of the teachings herein. The term "pigment" as used herein means a water-insoluble colorant. In practice, self-dispersed pigment particles are surface-treated, or chemically-modified, with functional groups so as to render the pigment particles dispersible in the liquid vehicle of the ink.

In the practice of the embodiments herein, specific functional groups are applied to a colorant particle with a useful mean diameter ranging from 0.005 to 10 μm. If the colorant particles are larger than this, they do not remain in solution well enough to be useful. Likewise, if the colorant particles are too small, they lack the appropriate properties to be useful. Colorants of this type result from chemical reactions where the colorant particles are derivatized with solubilizing groups that render the colorant dispersible in water. This resulting functionalized pigment is water-dispersible, with stability being similar to that of well known and commercially used water-soluble acidic and basic dyes.

Examples of water-dispersible black chromophores (or pigments) suitable for use herein are made from commercially available pigments obtained from colorant vendors such as Cabot Corp. Although many base pigments are useful in the practice of the present teachings, the following pigments comprise a partial list of useful base colorants; however, this listing is not intended to limit the claims herein, and is exemplary only. Base Cabot pigments include Monarch® 1400, Monarch® 1300, Monarch® 1100, Monarch®1000, Monarch®900, Monarch®880, Monarch® 800, and Monarch®700, Cab-O-Jet® 200 and Cab-O-Jet® 300. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from DuPont.

In the list above, Cab-O-Jet 200 and Cab-O-Jet 300 represent self-dispersed pigments with surface ionic groups attached, as described at the website of Cabot Corporation: http://www.cabot-corp.com/cws/product.nsf/PDSKEY/~~~COJ200/$FILE/CABOJET_200.pdf. The pigments used herein can use different chemical modifiers as well, for example, those described in U.S. Pat. No. 5,571,311 by Belmont et al, or in WO 01/94476 by An-Gong Yeh et al.

The pigment particle size is an important consideration in ink-jet printing, since the pigment particles must be sufficiently small to permit free flow of the ink through the inkjet printing devices. For example, the ejecting nozzles of thermal inkjet office printers typically have diameters on the order of about 10 to 60 micrometers. The pigment particle size is also important in considerations of stability and color strength. Given these considerations, the range of useful particle size is about 0.005 to 15 micrometers. Preferably, the pigment particle size should range from about 0.005 to about 1 micrometer, more preferably, from 0.05 to 0.2 micrometer.

Color Ink Formulation

The colorant employed in the color inks comprises one or more water-soluble dyes. The color inks may contain one or more multivalent salts or one or more organic acids, for reasons discussed below.

Multivalent Salts

In one embodiment herein, the styrene/maleic anhydride polymers in the black ink interact with incompatible multi-valent (inorganic or organic) salts in the second, or color, ink. These multi-valent salts must be soluble in the ink in the concentration employed. Suitably-employed cations for the multi-valent salt include alkaline earth metals of Group 2A of the Periodic Table (e.g., magnesium and calcium); the transition metals of Group 3B of the Periodic Table (e.g., lanthanum); cations from Group 3A of the Periodic Table (e.g., aluminum); and lanthanides (e.g., neodymium). Preferably, calcium and magnesium are employed as cations in the practice of the present teachings. Suitably employed anions associated with calcium or magnesium include nitrate, chloride, acetate, perchlorate, formate, and thiocyanate. Salts preferably employed in such second color inks include, but are not limited to, nitrate, chloride, and acetate salts of calcium and magnesium. If used, the salt should be present in the second ink in an amount ranging from about 1% to about 10%, preferably from about 1.5% to about 7%, more preferably from about 2% to about 6% by weight of the ink. The use of multi-valent salts in the color ink is more specifically discussed in above-referenced U.S. Pat. No. 5,536,306.

Organic Acids

Similarly, bleed and halo control can be implemented by using organic acids in the color inks, similar to what has been disclosed in U.S. Pat. No. 5,785,743, entitled "Bleed Alleviation in Ink-Jet Inks Using Organic Acids", issued on Jul. 28, 1998, to Raymond J. Adamic et al, and assigned to the same assignee as the present application.

An ink-jet ink composition employing an organic acid component and having an appropriate pH will render insoluble the pigment dispersion in the black inks by transforming the SMA polymer into water-insoluble protonated form.

Examples of organic acids that may be suitably employed in the embodiments herein include, but are not limited to, mono-, di-, and polyfunctional organic acids. In general, it is contemplated that any soluble organic acid having a pKa equal to or less than that of the pH-sensitive colorant of concern may be suitably employed. Preferably, one of the following classes of organic acids is employed: polyacrylic, acetic, glycolic, malonic, malic, maleic, ascorbic, succinic, glutaric, fumaric, citric, tartaric, lactic, sulfonic, and orthophosphoric acid and derivatives thereof. The organic acid component may also comprise mixtures of appropriate organic acids. The particular acid employed depends on the particular ink formulations. Succinic acid is generally preferred, although any of the other organic acids may also be suitably employed in the practice of these teachings.

The organic acid component should be present in the target ink-jet ink composition at a concentration ranging from about 0.25 to 20 wt %. An organic acid concentration of less than about 0.25 wt % would be insufficient to effectively reduce the pH differential, while an organic acid concentration of more than about 20 wt % would affect the reliability of printhead operation. Preferably, the acid concentration is in the range of about 1 to 5 wt %.

Colorants

A wide variety of dyes can be used in the color inks. The following list is intended to be exemplary only, and includes (1) cyan dyes, such as Acid Blue 9, Direct Blue 199, Projet Cyan (Avecia), Basic Blue 33, Projet Turquoise HA, Projet Turquoise H7G, and Acid Blue 185; (2) magenta dyes, such as Reactive Red 180, Acid Red 52, Reactive Red 23, Procion Red H8 B, Procion Red3-BNA, Projet Red PX6B, and Magenta 377; (3) yellow dyes, such as Acid Yellow 17, Acid Yellow 23, Y104 and Y1189 dyes (Ilford), Direct Yellow 4, Pro-jet Yellow 3RNA, Reactive Yellow 37, Direct Yellow 132, Acid Yellow 17, Acid Yellow 79, Direct Yellow 50, and Ilford Y104 dye; and (4) black dyes, such as Food Black 2, Pacified Reactive Black 31, Zeneca Colours 286 dye, and Zeneca Colours 287 dye. Other dyes can also be used, provided that they have high enough solubility in water and are compatible with the reactive components (that is, polyvalent salts or acids) present in the ink.

Ink-jet Ink Vehicle

The black ink compositions employed herein comprise the self-dispersed pigment, the polymer (styrene-maleic anhydride copolymer), and the ink vehicle. The embodiments herein, however, are not limited to self-dispersed pigments, and plain non-modified carbon black, such as Monarch 700, can also be used.

A typical formulation for a black ink useful in the practice of the present embodiments includes the pigment colorant (about 0.001% to 10 wt %), the styrene-maleic anhydride copolymer (0.1 to 10 wt % of the ink composition, preferably from about 0.1 to 3 wt %), one or more cosolvents (about 0.01 to 50 wt %), one or more water-soluble surfactants/amphiphiles (0 to about 40, preferably about 0.1 to 5 wt %), and water (balance).

On the other hand, the color ink contains one or more water-soluble dyes, a polyvalent cationic salt or organic acid for providing reactivity with the black inks, and the conventional ink vehicle components, such as organic solvents, humectants, surfactants, sequestering agents, and biocides.

One or more cosolvents may be added to the vehicle in the formulation of the ink (black or color). Classes of cosolvents employed in the practice of the teachings herein include, but are not limited to, aliphatic alcohols, aromatic alcohols, diols, glycol ethers, poly(glycol) ethers, caprolactams, lactones, formamides, acetamides, and long chain alcohols. Examples of compounds employed in the practice of the teachings herein include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologues of poly(ethylene glycol) alkyl ethers, poly(propylene glycol) alkyl ethers, higher homologues of poly(propylene glycol) alkyl ethers, in particular, polyethylene glycol and polypropylene glycol ethers of glycerol, N-alkyl caprolactams, unsubstituted caprolactams, substituted formamides, unsubstituted formamides, substituted acetamides, and unsubstituted acetamides. Specific examples of cosolvents that are preferably employed in the practice of these embodiments include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from about 0.01 to about 50 wt %, with about 0.1 to 20 wt % being preferred.

Some organic or inorganic salts can be used as the additives in the black ink formulation. Such usable salts include, but are not limited to, sodium benzoate, ammonium benzoate, and potassium benzoate. The typical loading of the salt in the black inks is from 0.01 to 1%, preferably from 0.05 to 0.5%. It is known in the art that the addition of salts of benzoic acid to pigmented inks improves such attributes as the optical density and edge acuity of the inks.

Water-soluble surfactants may be employed in the formulation of the vehicle of the ink. These surfactants are added as free components to the ink formulation and are not otherwise associated or intended to become part of the polymers described herein. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; POE amides; and dimethicone copolyols. Amphoteric surfactants such as substituted amine oxides are useful in the practice of these embodiments. Cationic surfactants such as protonated POE amines may also be used. U.S. Pat. No. 5,106,416, entitled "Bleed Alleviation Using Zwitterionic Surfactants and Cationic Dyes", issued on Apr. 21, 1992, to John R. Moffatt et al and assigned to the same assignee as the present application, discloses more fully most of the surfactants listed above. The non-ionic amphiphiles/surfactants are more preferred than the ionic surfactants. Specific examples of amphiphiles/surfactants that are preferably employed in the practice of the present teachings include iso-hexadecyl ethylene oxide 20, SURFYNOL CT-111, TERGITOL 15-S-7, and amine oxides, such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide. The concentration of the amphiphile/surfactants may range from 0 to 40 wt %, preferably from about 0.1% to 3 wt %. Similarly, aromatic sulfonated surfactants can be used, for example, Dowfax 8390 produced by Dow Chemical.

Consistent with the requirements herein, various types of additives may be employed in the ink to optimize the properties of the ink composition for specific applications. For example, as is well-known to those skilled in the art, biocides may be used in the ink composition to inhibit growth of microorganisms. Preferred examples of biocides include Ucarcide™, Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The ink vehicle of both color inks and the black ink can contain complexing agents such as ethylenediaminetetracetic acid (EDTA) disodium salt, that serves as a complexing agent for trace metals present in the inks that would interfere with the pen reliability. The typical amount of the complexing agent in the inks is from 0.0001 to 1%, more preferably from 0.01 to 0.3%.

The inks are formulated by combining the various components of the vehicle and mixing them with the colorants and, in the case of black inks, the styrene-maleic anhydride polymer disclosed herein. The viscosity of the final ink composition is from about 0.8 to about 8 cPs, preferably from about 0.9 to about 4 cPs.

A method of ink-jet printing is also disclosed herein. The inks of the present teachings may be used in any conventional ink-jet or bubble-jet or piezoelectric printer. Preferably, the inks are used in thermal inkjet printers. The ink is typically charged into a printer cartridge and printed on any medium. Examples of suitable media for printing includes paper, textiles, wood, and plastic.

EXAMPLES

Example 1

Formulation of the Black Inks

The following two black inks were prepared, listed below in Tables 1 and 2:

TABLE 1

Black Ink #1.

| Component | weight % |
| --- | --- |
| ammonium benzoate | 0.5 |
| Tris buffer | 0.5 |
| 1,5-pentanediol | 5.0 |
| glycerol propoxylate, MW 266 | 4.0 |
| 2-methyl-1,3-propanediol | 5.0 |
| 2-pyrrolidinone | 3.0 |
| Surfynol 465 | 0.1 |
| Proxel GXL | 0.2 |
| SMA-1000H polymer | 0.8 |
| Self-dispersed black pigment | 4.0 |
| water | to 100% |

TABLE 2

Black Ink #2 (Control).

| Component | weight % |
| --- | --- |
| ammonium benzoate | 0.5 |
| Tris buffer | 0.5 |
| 1,5-pentanediol | 5.0 |
| glycerol propoxylate, MW 266 | 4.0 |
| 2-methyl-1,3-propanediol | 5.0 |
| 2-pyrrolidinone | 3.0 |
| Surfynol 465 | 0.1 |
| Proxel GXL | 0.2 |
| Self-dispersed black pigment | 4.0 |
| water | to 100% |

Both inks contained 4% of self-dispersed pigment prepared based on Monarch 700 polymer by using the method described in U.S. Pat. No. 5,571,311 of Belmont et al. Black ink #1 contained 0.8% of SMA-1000H polymer as based on the dry weight, or 2% as based on the 40% solution in water in which the polymer is supplied, while black ink # 2 was a control. Both inks were tested using an HP5500 printer in conjunction with the default HP5500 color pens and printed on HP Printing Paper in two regimes. In the first regime, the black inks were underprinted with the color inks at 17% by volume, while in the second regime, no underprinting was made.

Table 3 below summarizes the performance of the two black inks described above.

TABLE 3

Results of Printing with Black Inks.

|  | Black #1 | Black #2 (control) |
| --- | --- | --- |
| Bleed, underprinted | good | fair |
| Bleed, no underprinting | fair | poor |
| Optical density, underprinted | 1.62 | 1.50 |
| Optical density, no underprinting | 1.58 | 1.36 |
| Nozzle health | good | good |

From Table 3, it is clear that adding the styrene-maleic anhydride copolymer to the black inks improves overall black performance in conjunction with the color; in particular, the presence of the copolymer improves the black-to-color bleed. The optical density is better for black ink #1, regardless of underprinting or no.

Example 2

The following black inks were prepared, listed below in Tables 4 and 5:

TABLE 4

Black Ink #3.

| Component | weight % |
| --- | --- |
| ammonium benzoate | 0.5 |
| Tris buffer | 0.35 |
| 1,5-pentanediol | 7.5 |
| Liponic ethylene glycol (LEG-1) | 4.0 |
| 2-methyl-1,3-propanediol | 7.5 |
| 2-pyrrolidinone | 4.5 |
| Surfynol 465 | 0.15 |
| Proxel GXL | 0.15 |
| SMA-1000H polymer | 0.8 |
| Self-dispersed black pigment | 3.0 |
| water | to 100% |

TABLE 5

Black Ink #4 (Control).

| Component | weight % |
| --- | --- |
| ammonium benzoate | 0.5 |
| Tris buffer | 0.35 |
| 1,5-pentanediol | 7.5 |
| Liponic ethylene glycol (LEG-1) | 4.0 |
| 2-methyl-1,3-propanediol | 7.5 |
| 2-pyrrolidinone | 4.5 |
| Surfynol 465 | 0.15 |
| Proxel GXL | 0.15 |
| Self-dispersed black pigment | 3.0 |
| water | to 100% |

Both inks contained 3 wt % of self-dispersed pigment prepared based on Monarch 700 polymer by using the method described in U.S. Pat. No. 5,571,311 of Belmont et al. Black ink #3 contained 0.8 wt % of SMA-1000H polymer as based on the dry weight, or 2 wt % as based on the 40% solution in water in which the polymer is supplied, while black ink # 4 was a control.

The inks were printed using the same printing system (HP 5500 printer) together with the default color inks of HP5500 color inks on 16 different media. (The color inks of HP5500 printer utilized the reactive bleed control as described in above-referenced U.S. Pat. No. 5,536,306.)

Bleed was assessed using a visual scale, from 1 to 6, with 1 being no bleed and 6 being very bad bleed performance. Bleed on 15 papers was evaluated. Two print modes were used, one with color ink underprinting ("UP") and one without underprinting ("no UP"). In both print modes and on nearly all papers, black-to-color bleed is improved in the ink formulated with the styrene-maleic anhydride polymer. The results are listed in Table 6 below.

TABLE 6

Bleed Results on Various Papers.

| Paper Designation | UP Black Ink #4 | UP Black Ink #3 | no UP Black Ink #4 | no UP Black Ink #3 |
| --- | --- | --- | --- | --- |
| UCGW | 3.5 | 1 | 3 | 1 |
| ARRM | 1.5 | 1 | 4.5 | 3 |
| OJIS | 3.5 | 1 | 5 | 3.5 |
| GPMS | 4.5 | 1.5 | 6 | 2.5 |
| HMCP | 4 | 1.5 | 4 | 3 |
| HPPP | 4 | 1.5 | 4 | 3.5 |
| HPMP | 2 | 1.5 | 4.5 | 3.5 |
| HOKM | 3.5 | 1.5 | 5 | 3.5 |
| PMCY | 4 | 1.5 | 5.5 | 4 |
| HPBW | 4 | 2 | 4 | 1 |
| GBND | 4 | 2 | 3.5 | 4 |
| XBMP | 3.5 | 2 | 5.5 | 5 |
| KCLX | 5.5 | 3 | 4.5 | 3 |
| SVCW | 5.5 | 3 | 4.5 | 4 |
| NCLD | 6 | 3.5 | 6 | 4 |
| SFIP | 5 | 4 | 4 | 3 |

Notes:
The following key is provided for the various papers:
UCGW = Union Camp Great White Multipurpose Paper
ARRM = Aussedat Rey-Reymat Paper
OJIS = Oji Sunace PPC
GPMS = Georgia Pacific Multisystem Paper
HMCP = Hammermill Copy Plus
HPPP = Hewlett Packard Printing Paper
HPMP = Hewlett Packard Multi-Purpose Paper
HOKM = Hokuetsu Kin-Mari Paper
PMCY = Stora Papirus Multicopy
HPBW = Hewlett Packard Bright White Paper
GBND = Gilbert Bond
XBMP = Xerox Business Multipurpose Paper
KCLX = Kymene KymCopy Lux
SVCW = Steinbeis Vision Classic White
NCLD = Neenah Classic Laid
SFIP = Sabah Forest Industries (SFI-PPC).

As seen from Table 6, in each instance, the black-to-color bleed with the styrene-maleic anhydride polymer was superior to the black-to-color bleed without the polymer.

INDUSTRIAL APPLICABILITY

The addition of a styrene-maleic anhydride copolymer to self-dispersed black pigment-based inkjet ink is expected to find use in inkjet printing involving black pigment-based ink and color dye-based inks.

What is claimed is:

1. An inkjet ink set, comprising:
a pigment-based black ink including a self-dispersed black pigment, at least one cosolvent, water, optionally at least one water-soluble surfactant/amphiphile, and a hydrolyzed styrene-maleic anhydride copolymer; and
at least one dye-based color ink including, a water-soluble dye, at least one cosolvent, water, and at least one of multivalent salts or organic acids;
wherein said hydrolyzed styrene-maleic anhydride copolymer interacts with said multivalent salts or with said organic acids by rendering said copolymer in said pigment-based black ink insoluble by transforming said copolymer into a water-insoluble protonated form and thereby improving black-to-color bleed;
wherein said organic acids are selected from the group consisting of: polyacrylic, acetic, glycolic, malonic, malic, maleic, ascorbic, succinic, glutaric, fumaric, citric, tartaric, lactic, sulfonic, ortho-phosphoric acids and mixtures thereof;
wherein no bleed-controlling polymer besides the hydrolyzed styrene-maleic anhydride copolymer is present in the pigment-based black ink;
and wherein no dispersible black pigment is present in said pigment-based black ink.

2. The inkjet ink set of claim 1 wherein said self-dispersed black pigment has a concentration in said pigment-based black ink ranging from about 0.001 to 10 wt %.

3. The inkjet ink set of claim 1 wherein said at least one cosolvent has a concentration in said pigment-based black ink ranging from about 0.01 to 50 wt %.

4. The inkjet ink set of claim 1 wherein said at least one surfactant/amphiphile has a concentration in said pigment-based black ink of up to 40 wt %.

5. The inkjet ink set of claim 4 wherein said at least one surfactant/amphiphile has a concentration ranging from about 0.1 to 5 wt %.

6. The inkjet ink set of claim 1 wherein said water comprises the balance of said pigment-based black ink.

7. The inkjet ink set of claim 1 wherein said hydrolyzed styrene-maleic anhydride copolymer has the general formula:

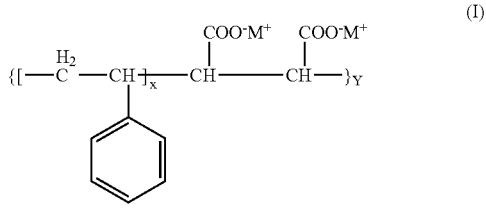

where counter-ion M+ is selected from the group consisting of sodium, potassium, ammonium, trimethylammonium, and lithium, and where X≅1 and Y≅22.

8. The inkjet ink set of claim 7 wherein said hydrolyzed styrene-maleic anhydride copolymer has a molar ratio of styrene to maleic anhydride repeat units within a range of 0.2 to 5.

9. The inkjet ink set of claim 8 wherein said molar ratio is within a range of 0.5 to 2.

10. The inkjet ink set of claim 7 wherein said hydrolyzed styrene-maleic anhydride copolymer has a molecular weight within a range of about 500 to 50,000 (molecular weight average).

11. The inkjet ink set of claim 10 wherein said molecular weight is within a range of about 1,000 to 10,000.

12. The inkjet ink set of claim 1 wherein said hydrolyzed styrene-maleic anhydride copolymer has a concentration in said pigment-based black ink ranging from about 0.1 to 10 wt %.

13. The inkjet ink set of claim 12 wherein said hydrolyzed styrene-maleic anhydride copolymer has a concentration ranging from about 0.1 to 3 wt %.

14. The inkjet ink set of claim 1 wherein said multivalent salts include at least a multivalent cation.

15. The inkjet ink set of claim 14 wherein said at least one multivalent cation is selected from the group consisting of alkaline metal earths of Group 2A of the Periodic Table, transition metals of Group 3B of the Periodic Table, cations from Group 3A of the Periodic Table, lanthanides, and mixtures thereof.

16. The inkjet ink set of claim 15 wherein said at least one multivalent cation is selected from the group consisting of magnesium, calcium, lanthanum, aluminum, neodymium, and mixtures thereof.

17. The inkjet ink set of claim 14 wherein said at least one multivalent cation is present in an amount ranging from about 1 to 10 wt % of said at least one dye-based color ink.

18. The inkjet ink set of claim 1 wherein said at least one dye-based color ink includes said organic acids.

19. The inkjet ink set of claim 1 wherein said organic acids are present in an amount ranging from about 0.25 to 20 wt % of said dye-based color ink.

20. The inkjet ink set of claim 19 wherein said organic acids are present in an amount ranging from about 1 to 5 wt % of said at least one dye-based color ink.

21. A method of controlling bleed between a black pigment-based inkjet ink and a color dye-based inkjet ink, said method comprising:
formulating said pigment-based black ink including hydrolyzed styrene-maleic anhydride copolymer, at least one self-dispersed black pigment, at least one cosolvent, water, and optionally at least one water-soluble surfactant/amphiphile;
formulating said at least one dye-based color ink including a water-soluble dye, at least one cosolvent, water, and at least one of multivalent salts and organic acids;
wherein said organic acids are selected from the group consisting of: polyacrylic, acetic, glycolic, malonic, malic, maleic, ascorbic, succinic, glutaric, fumaric, citric, tartaric, lactic, sulfonic, ortho-phosphoric acids and mixtures thereof; and
printing said pigment-based black ink adjacent said at least one dye-based color ink whereby said hydrolyzed styrene-maleic anhydride copolymer interacts with said multivalent salts or with said organic acids by rendering said hydrolyzed styrene-maleic anhydride copolymer in said pigment-based black ink insoluble by transforming said hydrolyzed styrene-maleic anhydride copolymer into a water-insoluble protonated form
wherein no bleed-controlling polymer besides the hydrolyzed styrene-maleic anhydride copolymer is present in the pigment-based black ink;
and wherein no dispersible black pigment is present in the pigment-based black ink.

22. The method of claim 21 wherein said self-dispersed black pigment has a concentration in said pigment-based black ink ranging from about 0.001 to 10 wt %.

23. The method of claim 21 wherein said at least one cosolvent has a concentration in said pigment-based black ink ranging from about 0.01 to 50 wt %.

24. The method of claim 21 wherein said at least one surfactant/amphiphile has a concentration in said pigment-based black ink up to 40 wt %.

25. The method of claim 24 wherein said at least one surfactant/amphiphile has a concentration ranging from about 0.1 to 5 wt %.

26. The method of claim 21 wherein said water comprises the balance of said pigment-based black ink.

27. The method of claim 21 wherein said hydrolyzed styrene-maleic anhydride copolymer has the general formula:

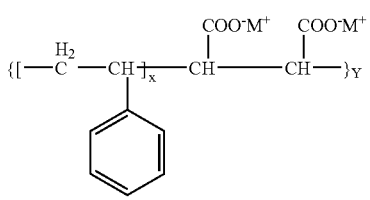 (I)

where counter-ion M+ is selected from the group consisting of sodium, potassium, ammonium, trimethylammonium, and lithium, and where X≅1 and Y≅22.

28. The method of claim 27 wherein said hydrolyzed styrene-maleic anhydride copolymer has a molar ratio of styrene to maleic anhydride repeat units within a range of 0.2 to 5.

29. The method of claim 28 wherein said molar ratio is within a range of 0.5 to 2.

30. The method of claim 27 wherein said hydrolyzed styrene-maleic anhydride copolymer has a molecular weight within a range of about 500 to 50,000 (molecular weight average).

31. The method of claim 30 wherein said molecular weight is within a range of about 1,000 to 10,000.

32. The method of claim 30 wherein said hydrolyzed styrene-maleic anhydride copolymer has a concentration in said pigment-based black ink of about 0.1 to 10 wt %.

33. The method of claim 32 wherein said hydrolyzed styrene-maleic anhydride copolymer has a concentration of about 0.1 to 3 wt %.

34. The method of claim 21 wherein said multivalent salts include at least one multivalent cation.

35. The method of claim 34 wherein said at least one multivalent cation is selected from the group consisting of alkaline metal earths of Group 2A of the Periodic Table, transition metals of Group 3B of the Periodic Table, cations from Group 3A of the Periodic Table, lanthanides, and mixtures thereof.

36. The method of claim 35 wherein said at least one multivalent cation is selected from the group consisting of magnesium, calcium, lanthanum, aluminum, neodymium, and mixtures thereof.

37. The method of claim 34 wherein said at least one multivalent cation is present in an amount ranging from about 1 to 10 wt % of said color ink.

38. The method of claim 21 wherein said at least one dye-based color ink includes said organic acids.

39. The method of claim 38 wherein said organic acids are present in an amount ranging from about 0.25 to 20 wt % of said at least one dye-based color ink.

40. The method of claim 39 wherein said organic acids are present in an amount ranging from about 1 to 5 wt % of said at least one dye-based color ink.

* * * * *

UNITED STATES PATENT AND TRADEMARK OFFICE
CERTIFICATE OF CORRECTION

PATENT NO. : 7,417,079 B2  Page 1 of 1
APPLICATION NO. : 10/628966
DATED : August 26, 2008
INVENTOR(S) : Patricia A Wang et al.

It is certified that error appears in the above-identified patent and that said Letters Patent is hereby corrected as shown below:

In column 1, line 21, delete "dean" and insert -- clean --, therefor.

Signed and Sealed this

Twenty-ninth Day of June, 2010

David J. Kappos
*Director of the United States Patent and Trademark Office*